(12) United States Patent
Yeh et al.

(10) Patent No.: US 8,411,048 B2
(45) Date of Patent: Apr. 2, 2013

(54) TOUCH PANEL WITH PARALLEL ELECTRODES

(75) Inventors: Herng-Ming Yeh, Taoyuan Hsien (TW); Yi-Ta Chen, Hsinchu (TW)

(73) Assignee: Higgstec Inc., Taoyuan Hsien (TW)

( * ) Notice: Subject to any disclaimer, the term of this patent is extended or adjusted under 35 U.S.C. 154(b) by 930 days.

(21) Appl. No.: 12/503,178

(22) Filed: Jul. 15, 2009

(65) Prior Publication Data
US 2010/0164902 A1    Jul. 1, 2010

(30) Foreign Application Priority Data

Dec. 26, 2008  (TW) ................................ 97150841 A

(51) Int. Cl.
G06F 3/041  (2006.01)
(52) U.S. Cl. ..................................... 345/173; 178/18.01
(58) Field of Classification Search ........... 345/173–181
See application file for complete search history.

(56) References Cited

U.S. PATENT DOCUMENTS

| | | | |
|---|---|---|---|
| 3,798,370 A | 3/1974 | Hurst | |
| 4,198,539 A * | 4/1980 | Pepper, Jr. | 178/18.05 |
| 4,371,746 A | 2/1983 | Pepper, Jr. | |
| 4,661,655 A | 4/1987 | Gibson et al. | |
| 4,731,508 A | 3/1988 | Gibson et al. | |
| 4,797,514 A | 1/1989 | Talmage, Jr. et al. | |
| 4,822,957 A | 4/1989 | Talmage, Jr. et al. | |
| 4,933,660 A | 6/1990 | Wynne, Jr. | |
| 5,045,644 A * | 9/1991 | Dunthorn | 178/18.05 |
| 5,804,773 A | 9/1998 | Wilson et al. | |
| 5,815,141 A | 9/1998 | Phares | |
| 6,305,073 B1 * | 10/2001 | Badders, Jr. | 29/622 |
| 6,396,484 B1 | 5/2002 | Adler et al. | |
| 6,630,929 B1 | 10/2003 | Adler et al. | |
| 7,148,881 B2 | 12/2006 | Lee et al. | |
| 7,265,686 B2 | 9/2007 | Hurst et al. | |
| 7,307,626 B2 | 12/2007 | Martchovsky | |
| 7,339,579 B2 * | 3/2008 | Richter et al. | 345/173 |
| 7,952,567 B2 * | 5/2011 | Aroyan et al. | 345/174 |
| 8,031,180 B2 * | 10/2011 | Miyamoto et al. | 345/173 |

\* cited by examiner

*Primary Examiner* — Duc Dinh
(74) *Attorney, Agent, or Firm* — Rabin & Berdo, P.C.

(57) ABSTRACT

The disclosure discloses a touch panel with parallel electrodes. The parallel electrodes mainly include a pair of parallel electrodes in x-axis and a pair of parallel electrodes in y-axis, further forming a ring structure by means of a series connection of eight corner resistances. The ring structure is the improvement of the electrode design, and is formed on the conductive layer of touch panel with a chain of series resistances. The voltage support of the conductive layer of the ring structure is provided by the corner electrodes on the conductive layer for touch detection.

17 Claims, 7 Drawing Sheets

TOUCH PANEL WITH PARALLEL ELECTRODES

CROSS-REFERENCES TO RELATED APPLICATIONS

This non-provisional application claims priority under 35 U.S.C. §119(a) on Patent Application No(s). 97150841 filed in Taiwan, R.O.C. on Dec. 26, 2008, the entire contents of which are hereby incorporated by reference.

BACKGROUND

1. Technical Field

The disclosure generally relates to a touch panel, more particularly, the disclosure relates to a touch panel with parallel electrodes.

2. Description of the Related Art

Nowadays, the most popular touch panels sold in the market are generally classifiable as resistive-type and capacitive-type touch panels. The resistive-type can also be classified into 4-wire resistive-type, 5-wire resistive-type, 6-wire resistive-type, 7-wire resistive-type and 9-wire resistive-type. The capacitive-type can be classified into surface capacitive touch screen (SCT) and projective capacitive touch screen (PCT) which also designated digital-touch technology. The resistive-type and the surface capacitive touch screen (SCT) are generally designated analog-touch technology.

In recent years, the most popular analog-touch technology has generally used an input controlled by a 4-point voltage supply, as mentioned in U.S. Pat. Nos. 3,798,370A, 4,371746A, 4,661,655A, 4,731,508A, 4,797,514A, 4,822,957A, 4,933,660A, 5,804,773A, 5,815,141A, 6,396,484B1,6,630,929B1, 7,148,881B2, 7,265,686B2, 7,307,626B2 etc. For touch detection, they usually control the input source by inputting the controlled voltage in four corners.

For example, the operating principal of surface capacitive touch screen is as follows: A uniform electrical field is formed on the ITO layer. The capacitive charge effect results from the panel being touch by the fingers. The capacitance-coupled effect between the transparent electrodes and fingers causes current variation in the panel. Thus, the controlled devices can calculate the position of contact by means of measuring the current magnitude of four electrodes in four corners.

Please refer to FIG. 1, which shows a schematic diagram of a five-wire touch panel 10 of the related art. By using the electrode wires, the voltage controlled unit (un-sketched) located outside the touch panel connects the four electrodes, A, B, C and D of conductive layer 11 to the electrode plates, PA, PB, PC and PD. Moreover, the PE is connected to the touch layer (un-sketched). The conductive layer enclosed by the chains of series resistances, CAR-YU, CAR-YD, CAR-XR and CAR-XL around conductive layer 11, is the effective touch area. The four electrodes, A, B, C and D generate a uniformly distributed electrical field which is used for position detecting of resistive-type and the surface capacitive touch screens (SCT) by means of by the chains of series resistances, CAR-YU, CAR-YD, CAR-XR and CAR-XL around conductive layer 11, and the voltage of voltage controlled unit.

Please refer to FIG. 2 and FIG. 3, which show the schematic diagrams of a controlled mode of detecting voltage in the y-axis, and detecting voltage in the y-axis, of the touch panel. Now refer to FIG. 2, which is a schematic diagram of a controlled mode of detecting a voltage in the y-axis of the touch panel. As the voltage controlled unit inputs voltages to the electrode plates (where PA=+5V, PB=0V, PC=0V and PD=+5V), an electrical field is generated within chains of series resistances, CAR-YU, CAR-YD, CAR-XR and CAR-XL around conductive layer 11, as shown in FIG. 2, where the dash-line is the equipotential line and the solid-line indicates the direction of the current. The touched position in y-axis can be detected, as an object is contacting the touch panel. Now refer to FIG. 3, which is a schematic diagram of a controlled mode of detecting voltage in the x-axis of the touch panel. As the voltage controlled unit inputs voltages to the electrode plates (where PA=+5V, PB=+5V, PC=0V and PD=0V), an electrical field is generated within chains of series resistances, CAR-YU, CAR-YD, CAR-XR and CAR-XL around conductive layer 11 as shown in FIG. 3, where the dash-line is the equipotential line and the solid-line indicates the direction of the current. The touched position in x-axis can be detected, as an object is contacting the touch panel.

However, touch panel technology has matured considerably over the last two or 10 three decades, with the increasing development of technology. Therefore, the latest trend in touch panel technology is economic, for example, the reduction of frame size, low power consumption or the request of uniformity of electrical field distribution in the frame, especially in the corners. Consequently, every touch panel factory and store of continues to develop their technology further, as a result of competition.

SUMMARY

It is an objective of the disclosure to provide a touch panel with parallel electrodes that possesses the advantage of low power consumption, and the improvement of electrical field uniformity near the edges.

To achieve the above objectives, the disclosure provides a touch panel with parallel electrodes, includes a substrate, a conductive layer formed on the substrate (the conductive layer including an internal contact area and an edge resistance around the internal contact area), a plurality of corner electrodes, connected to the corner of the edge resistance, a pair of parallel electrodes in x-axis, connected to a voltage controlled unit and isolated from the edge resistance, formed out of both sides in x-axis direction of the edge resistance of the conductive layer, a pair of parallel electrodes in y-axis, connected to the voltage controlled unit and isolated from the edge resistance, formed out of both sides in y-axis direction of the edge resistance of the conductive layer, and a plurality of corner resistances, each of the plurality of corner resistances including two terminals, one terminal connected either to parallel electrode in x-axis or the parallel electrode in y-axis, and the other connected to one terminal of the plurality of corner electrodes.

BRIEF DESCRIPTION OF THE DRAWINGS

All the objects, advantages, and novel features of the disclosure will become more apparent from the following detailed descriptions when taken in conjunction with the accompanying drawings.

DETAILED DESCRIPTION

Although the disclosure has been explained in relation to several preferred embodiments, the accompanying drawings and the following detailed descriptions are the preferred embodiment of the disclosure. It is to be understood that the following disclosed descriptions will be examples of the disclosure, and will not limit the disclosure to the drawings and the special embodiment.

Figure 1:
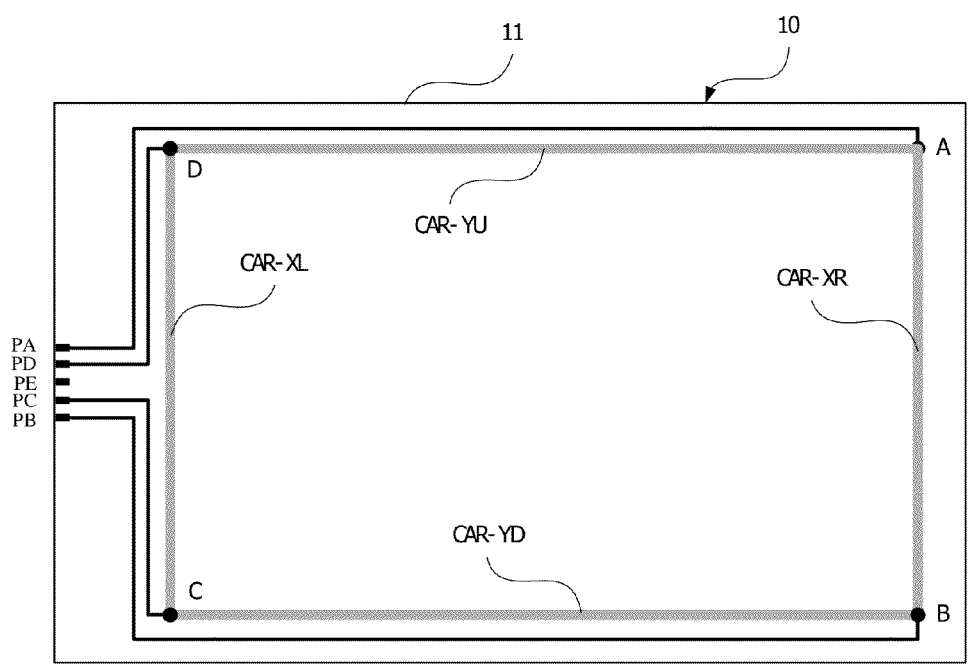
FIG. 1 is a schematic diagram of a five-wire touch panel 10 of the related art.
Figure 2:
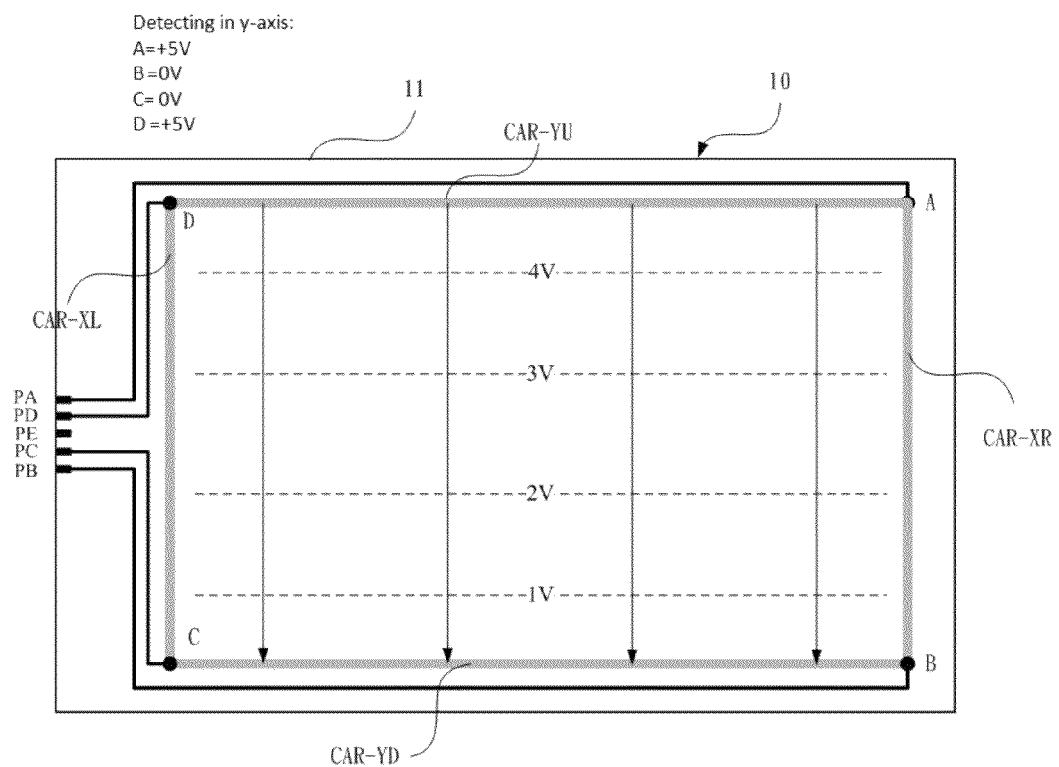
FIG. 2 is a schematic diagram of a controlled mode of detecting voltage in the y-axis of the touch panel of prior art.
Figure 3:
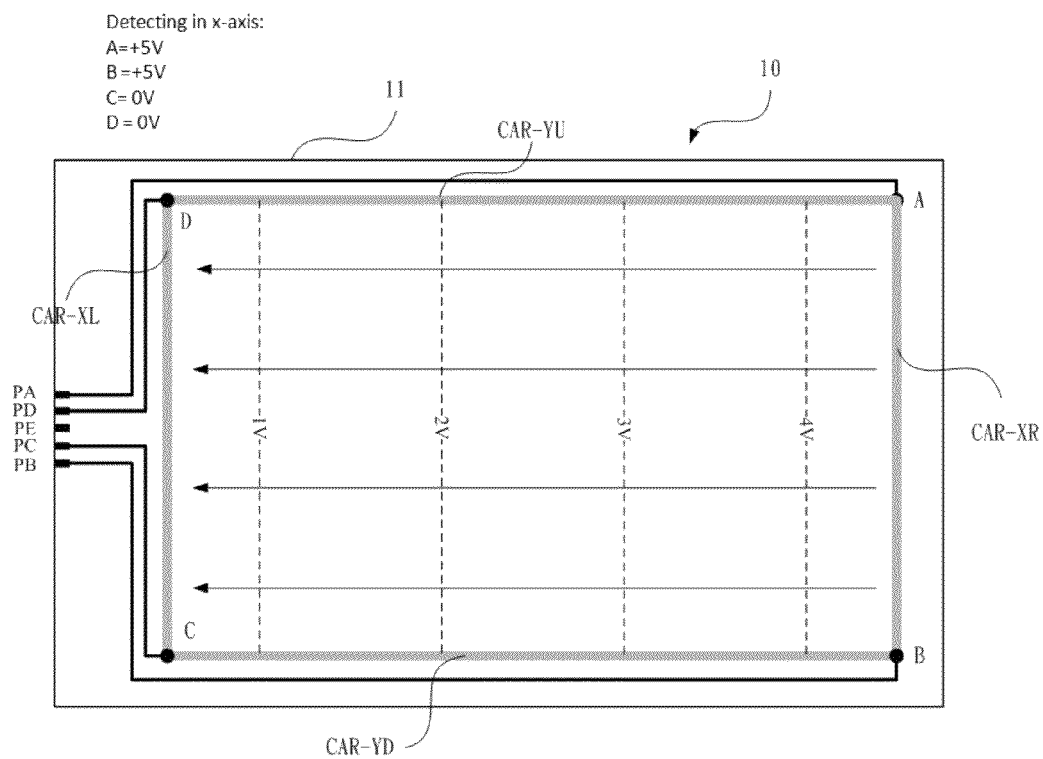
FIG. 3 is a schematic diagram of a controlled mode of detecting voltage in the x-axis of the touch panel of prior art.
Figure 4:
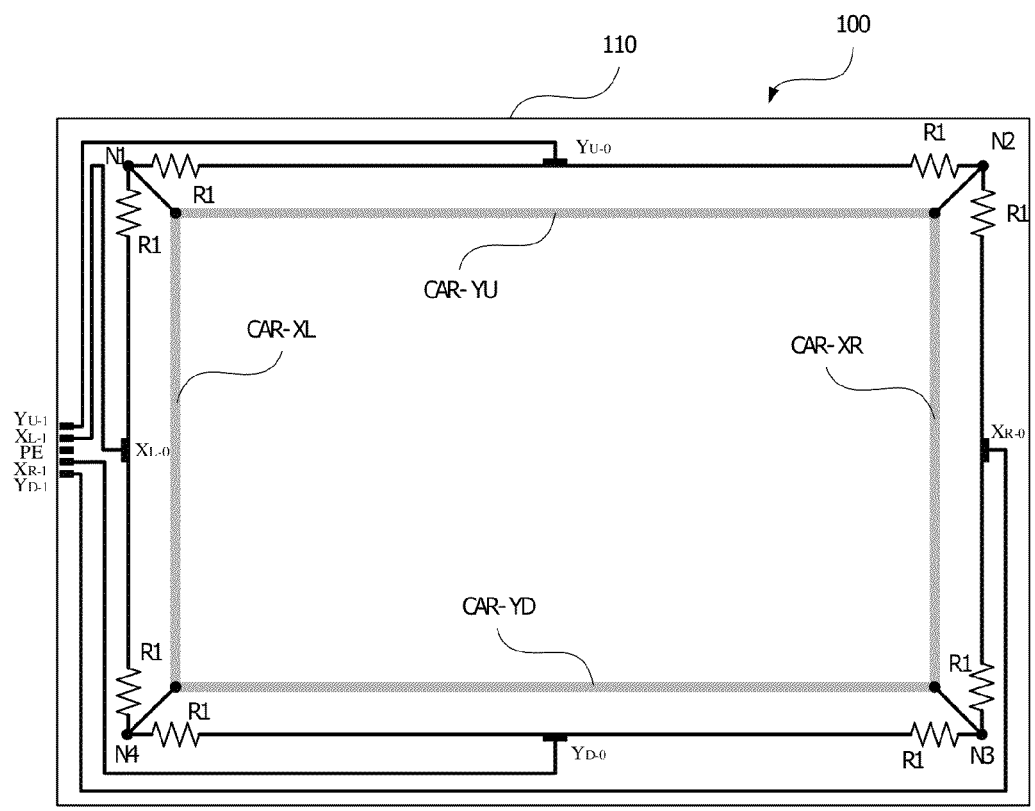
FIG. 4 is a schematic diagram of a touch panel with parallel electrodes 100 of the disclosure.

To understand the spirit of the disclosure, please refer to FIG. 4, which shows a schematic diagram of a touch panel with parallel electrodes 100. Compared to the conventional four-corner electrodes, the touch panel with two pairs of parallel electrodes is designed as a touch panel with two pairs of parallel electrodes. The two pairs of parallel electrodes formed on the conductive layer 110 are YU-0 and YD-0 in y-axis and XR-0 and XL-0 in x-axis, respectively. The parallel electrodes in the disclosure can be applied to resistive-type touch panels, or satisfy the requirement of equal potential in capacitive-type touch panels.

Moreover, each parallel electrode in y-axis and in x-axis possesses two terminals, and all terminals of the parallel electrodes in y-axis, YU-0 and YD-0, are connected in series to the resistances, R1. Similarly, all of terminals of the parallel electrodes in x-axis, XR-0 and XL-0, are also connected in series to the resistances, R1. Therefore, the others terminals of resistances R1, connected in series to YU-0, YD-0, XR-0 and XL-0 are connected to each other and form four nodes, N1, N2, N3 and N4, respectively. These four nodes are constructed of the four electrodes of the conductive layer 110, namely the voltage inputs of four chains of series resistances, CAR-YU, CARYD, CAR-XR, and CAR-XL.

The parallel electrodes in y-axis, YU-0 and YD-0, and the parallel electrodes in x-axis, XR-0 and XL-0, are connected respectively to four electrode plates, YU-1, YD-1, XR-1 and XL-1, by using the conductive wires, where the parallel electrodes and the conductive wires can be chosen from silver conductive wires or other metals such as molybdenum/aluminum/molybdenum metal layers, chromium conductive wires or other metals with better electric conductivity. Silver conductive wires which are fabricated by silver paste above 500□ are preferred for the reasons of frame-width reduction by narrowing the wires effectively, low resistivity (low power consumption), and better linear support of the touched are an edge.

Since the resistance of each of the four conductive wires is identical and close to zero, the voltage drops between the four electrode plates (YU-1, YD-1, XR-1 and XL-1), and the parallel electrodes YU-0, YD-0, XR-0 and XL-0 (which are connected by using four silver conductive wires), are nearly zero. Furthermore, the voltage drops of two terminals of the parallel electrodes, i.e. the parts connected to resistances, R1, are equivalent to the voltage provided by four electrode plates, YU-1, YD-1, XR-1 and XL-1. This is because the parallel electrodes are fabricated from silver conductive wires. The voltage drops of four nodes, N1, N2, N3 and N4, are not ignored because of the resistances, R1. The range of the voltage drops depends on the total resistance value (effective resistance value), of resistance R1, and the chain of series resistances CAR-YU, CAR-YD, CAR-XR, CAR-XL. That is, the value of resistance R1, can be determined firstly and designed for according to the practical demands of power consumption. For example, the resistance values of chain of series resistances CAR-YU, CAR-YD, CAR-XR and CAR-XL, are 2 k~5 kΩ, and the resistances R1 are designed to be 2 k~5 kΩ. This means that the resistance values of R1 can be designed according to the resistance values of a chain of series resistances and the practical demands of power consumption.

Figure 5:
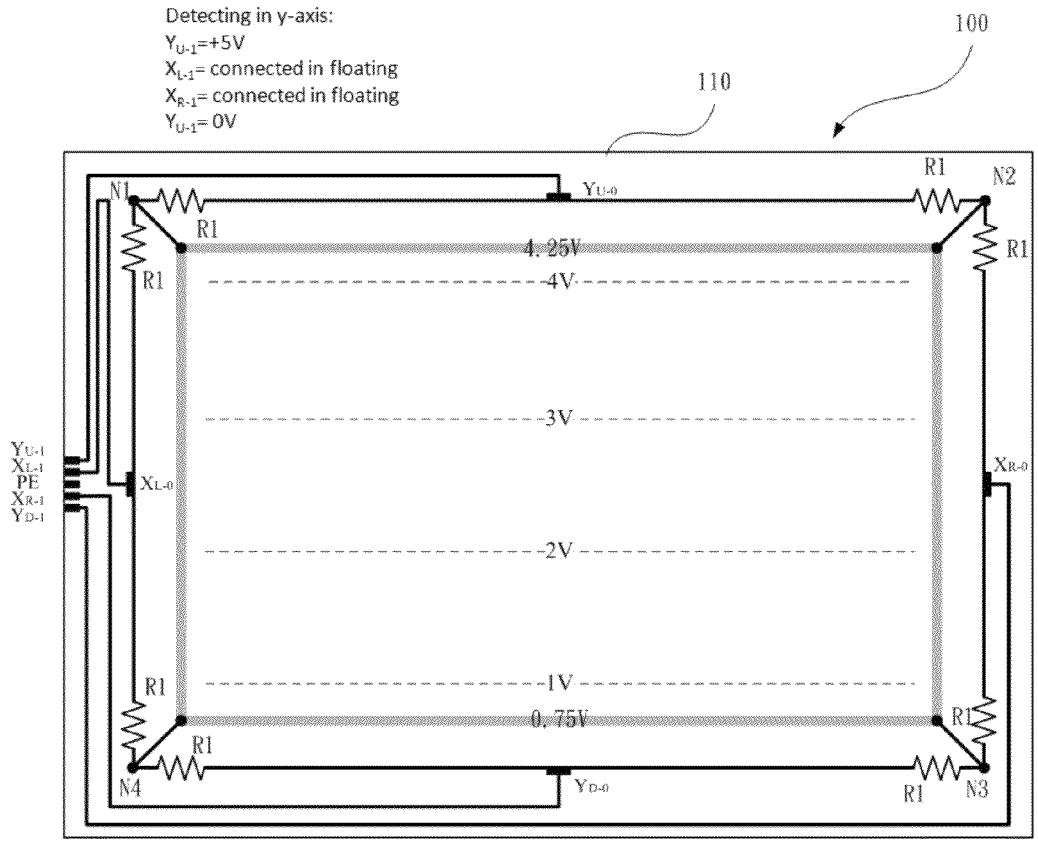
FIG. 5 is a schematic diagram of a controlled mode of detecting voltage in the y-axis of the touch panel of the disclosure.

The controlled method of the parallel electrodes according to the disclosure is interpreted in the following manner. Please refer to FIG. 5 and FIG. 6, which show the controlled mode of detecting voltage in y-axis and in x-axis, respectively. In particular, FIG. 5 shows the controlled mode of detecting voltage in y-axis. Moreover, the electrical field distribution of the chain of series resistances CAR-YU, CAR-YD, CAR-XR and CAR-X, in the conductive layer 110 is displayed as the voltage controlled unit input voltages to the electrode plates with YU-1=+5V, YD-1=0V, XR-1 and XL-1 both connected in a floating manner. Moreover, the voltage-equipotential line of the chain of series resistances CAR-YU is 4.25V and the voltage-equipotential line of the chain of series resistances CAR-YD is 0.75V in the example shown in FIG. 5, where the voltage of 0.75V results from resistance R1. The dash-line is the equipotential line and the solid-line indicates the current direction. The touched position in y-axis can be detected as an object is contacting the touch panel.

The operating voltage can be set from 1.5V to 15V.

Figure 6:
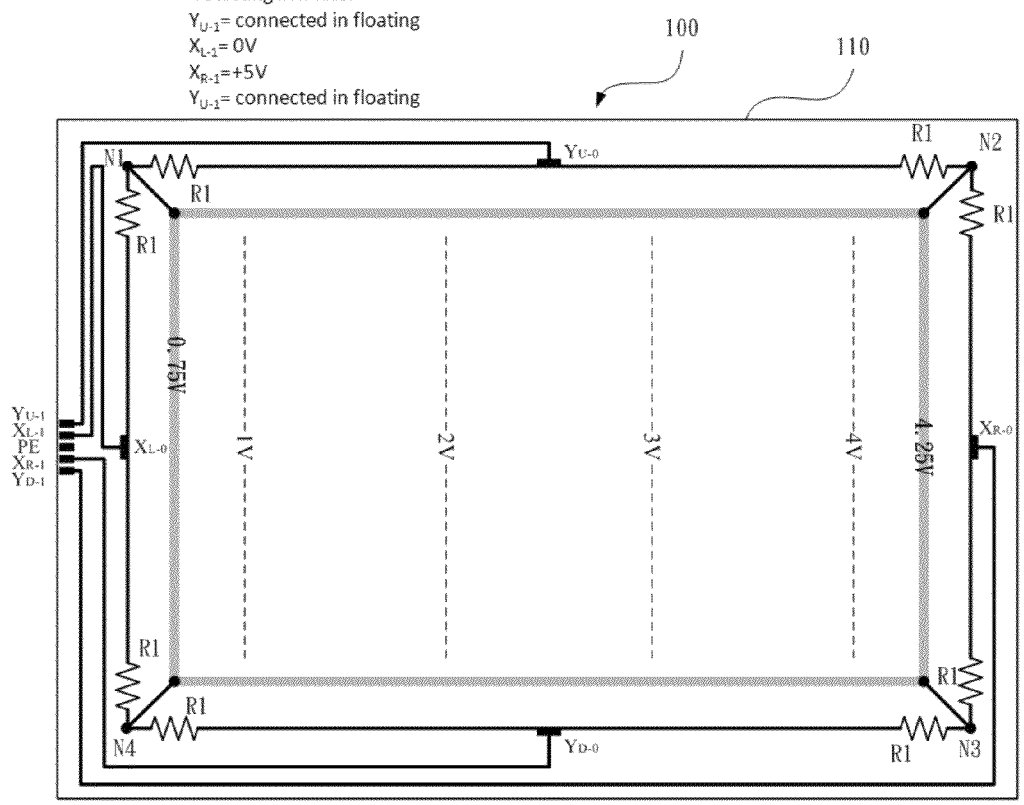
FIG. 6 is a schematic diagram of a controlled mode of detecting voltage in the x-axis of the touch panel of the disclosure.
Figure 7:
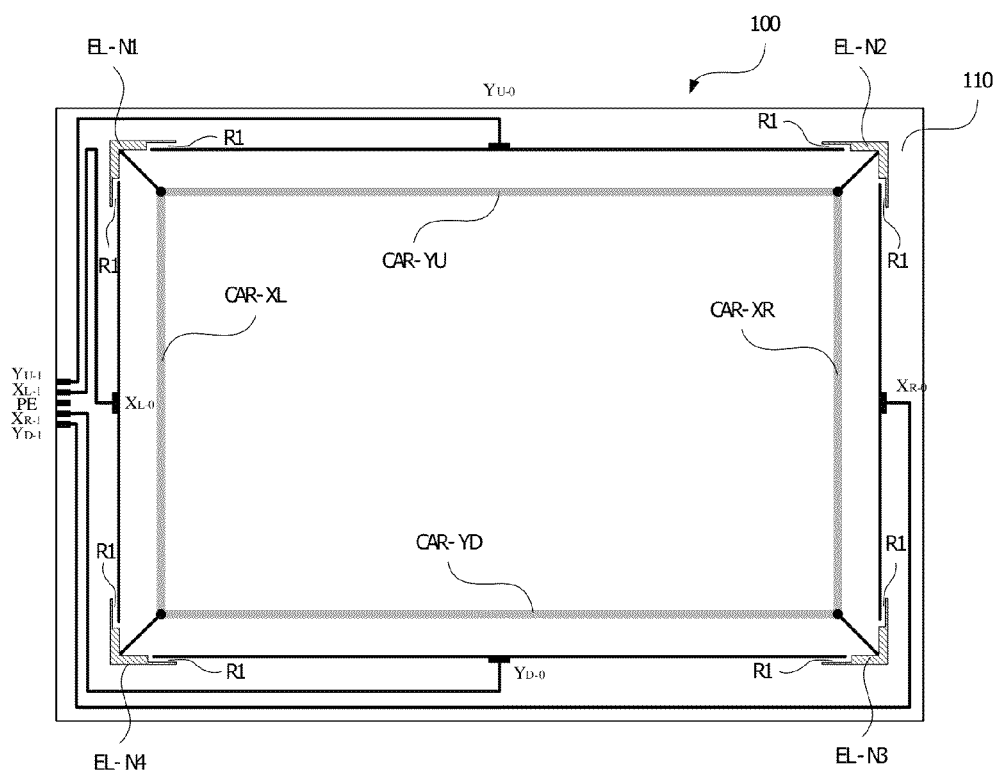
FIG. 7 is a specific embodiment of fabrication of resistance, R1, in the disclosure.

Please refer to FIG. 6, which shows the controlled mode of detecting voltage in y-axis, moreover the electrical field distribution of the chain of series resistances CAR-YU, CAR-YD, CAR-XR and CAR-X in the conductive layer 110 is displayed as the voltage controlled unit input voltages to the electrode plates with YU-1=+5V, YD-1=0V, XR-1 and XL-1 are both connected in a floating manner. Moreover, the voltage-equipotential line of the chain of series resistances, CAR-YU, is 4.25V and the voltage-equipotential line of the chain of series resistances, CAR-YD, is 0.75V in the example shown in FIG. 5, wherein, the voltage of 0.75V is resulted from resistance, R1. The dash-line is the equipotential line and the solid-line indicates the current direction. The touched position in y-axis can be detected as an object is contacting the touch panel.

Using the descriptions mentioned above, the input methods of electrodes in four corners in the disclosure can be varied by using the parallel electrodes. Furthermore, the control methods of the voltage controlled unit can be tuned with the input, at the same time. This type of structure also improves the non-uniformity of the electrical field in the corner. In addition, it decreases the operating power consumption because of the reduction of the voltage distributed in the conductive layer (touch area).

Please refer to FIG. 6, which shows the specific embodiment of fabrication of resistance R1, in the disclosure. The resistance R1 can be fabricated by means of a L-shaped electrode and formed by the gaps between L-shaped electrode and parallel electrodes YU-0, YD-0, XR-0 and XL-0. That is, the gaps between L-shaped electrode and parallel electrodes constitute the conductive layer, which can be resistance R1. The resistance value can be calculated by the width, length and electric conductivity of the conductive layer. The fundamental formula is $R = \rho L/A$, where R is the resistance value, $\rho$ is the electric conductivity, A is the cross section area, and L is the length.

Furthermore, the L-shaped electrode also can be fabricated in the same manner with parallel electrodes, that is, using the same material and process. For example, it may be formed on the conductive layer by means of screen printing, using unleaded silver paste at a high temperature. The L-shaped electrode welded on the transparent conductive layer with silver paste at a temperature above 500☐ results in an extremely small resistance value between the conductor interfaces (near to zero). Aside from the benefits of high temperature tolerance and environmental resistance, the crystallization of silver conductive wires and conductive layer at a high temperature can also enhance product chemical resistance, reliability, and lifetime. The material for the L-shaped electrode can also be chosen among from molybdenum/aluminum/molybdenum metal layers, chromium or other metals with better electric conductivity.

Although the embodiment has been explained in relation to its preferred embodiment, this explanation is not used to limit the embodiment. It is to be understood that many other possible modifications and variations can be made by those skilled in the art, without departing from the spirit and scope of the embodiment as claimed hereafter.

What is claimed is:

1. A touch panel with parallel electrodes, comprising:
   a substrate;
   a conductive layer, formed on the substrate, the conductive layer comprising an internal contact area and an edge resistance around the internal contact area;
   a plurality of corner electrodes, connected to the corner of the edge resistance;
   a pair of parallel electrodes in x-axis, connected to a voltage controlled unit and isolated from the edge resistance, formed out of both sides in x-axis direction of the edge resistance of the conductive layer;
   a pair of parallel electrodes in y-axis, connected to the voltage controlled unit and isolated from the edge resistance, formed out of both sides in y-axis direction of the edge resistance of the conductive layer; and
   a plurality of corner resistances, each of the plurality of corner resistances comprises two terminals, one terminal is connected to either the parallel electrode in x-axis or the parallel electrode in y-axis, and the other is connected to one terminal of the plurality of corner electrodes.

2. The touch panel with parallel electrodes according to claim 1, wherein the parallel electrodes in x-axis, the parallel electrodes in y-axis and the plurality of corner electrodes are selected from the groups of silver conductive wires, molybdenum/aluminum/molybdenum metal layers and chromium conductive wires.

3. The touch panel with parallel electrodes according to claim 1, wherein the parallel electrodes in x-axis, the parallel electrodes in y-axis and the plurality of corner electrodes are the silver conductive wires which are fabricated using silver paste at a temperature above 500☐.

4. The touch panel with parallel electrodes according to claim 1, wherein the plurality of corner electrodes are L-shaped and formed between the gaps of the plurality of corner electrodes and the parallel electrodes in x-axis or the parallel electrodes in y-axis.

5. The touch panel with parallel electrodes according to claim 1, wherein the edge resistance is a chain of series resistances.

6. The touch panel with parallel electrodes according to claim 1, wherein the resistance of the edge resistance is from 2 k to 5 k$\Omega$, and the resistance of the plurality of corner electrodes resistances are from 2 k to 5 k$\Omega$.

7. The touch panel with parallel electrodes according to claim 1, wherein the plurality of corner electrodes resistances are equal.

8. The touch panel with parallel electrodes according to claim 1, further comprising:
   a plurality of conductive wires used for the connecting between the parallel electrodes in x-axis or the parallel electrodes in y-axis to the voltage controlled unit.

9. A touch panel with parallel electrodes, comprising:
   a substrate;
   a conductive layer, formed on the substrate, the conductive layer comprising an internal contact area and an edge resistance around the internal contact area;
   a plurality of corner electrodes, connected to the corner of the edge resistance;
   a pair of parallel electrodes in x-axis, connected to a voltage controlled unit and isolated from the edge resistance, formed out of both sides in x-axis direction of the edge resistance of the conductive layer;
   a pair of parallel electrodes in y-axis, connected to the voltage controlled unit and isolated from the edge resistance, formed out of both sides in y-axis direction of the edge resistance of the conductive layer; and
   a plurality of corner resistances, each of the plurality of corner resistances comprising two terminals, one connected either to the x-axis parallel electrode or the y-axis parallel electrode, and the other connected to one terminal of the plurality of corner electrodes;
   wherein the voltage controlled unit provides a source voltage and a reference voltage to the parallel electrode in y-axis and is connected in a floating manner to the parallel electrode in x-axis to detect the touch coordination in y-axis, and provides the source voltage and the reference voltage to the x-axis parallel electrode and is connected in a floating manner to the parallel electrode in y-axis to detect the touch coordination in x-axis.

10. The touch panel with parallel electrodes according to 9, wherein the parallel electrodes in x-axis, the parallel electrodes in y-axis and the plurality of corner electrodes are selected from the groups of silver conductive wires, molybdenum/aluminum/molybdenum metal layers and chromium conductive wires.

11. The touch panel with parallel electrodes according to claim 9, wherein the parallel electrodes in x-axis, the parallel electrodes in y-axis and the plurality of corner electrodes are the silver conductive wires which are fabricated by silver paste above 500☐.

12. The touch panel with parallel electrodes according to claim 9, wherein the plurality of corner electrodes are L-shaped and formed between the gaps of the plurality of corner electrodes and the parallel electrodes in x-axis or the parallel electrodes in y-axis.

13. The touch panel with parallel electrodes according to claim 9, wherein the edge resistance is a chain of series resistances.

14. The touch panel with parallel electrodes according to claim 9, wherein the resistance of the edge resistance is from 2 k to 5 k$\Omega$, and the resistance of the plurality of corner electrodes resistances are from 2 k to 5 k$\Omega$.

15. The touch panel with parallel electrodes according to claim 9, wherein the plurality of corner electrodes resistances are equal to each other.

16. The touch panel with parallel electrodes according to claim 9, further comprising:
- a plurality of conductive wires, used for the connecting between the parallel electrodes in x-axis or the parallel electrodes in y-axis to the voltage controlled unit.

17. The touch panel with parallel electrodes according to claim 9, wherein the source voltage is from 1.5 to 15V, and the reference voltage is ground connection.

* * * * *